United States Patent
McRae

(10) Patent No.: US 9,407,856 B2
(45) Date of Patent: Aug. 2, 2016

(54) TRANSPARENT FIPEL BACKLIGHT PANELS WHICH DISPLAY COLORED LIGHT FROM A FRONT SURFACE TO A LIGHT MODULATOR AND A WHITE LIGHT FROM A BACK SURFACE

(71) Applicant: Vizio Inc, Irvine, CA (US)

(72) Inventor: Matthew McRae, Irvine, CA (US)

(73) Assignee: Vizio, Inc., Irvine, CA (US)

( * ) Notice: Subject to any disclaimer, the term of this patent is extended or adjusted under 35 U.S.C. 154(b) by 46 days.

(21) Appl. No.: 13/906,032

(22) Filed: May 30, 2013

(65) Prior Publication Data

US 2014/0354893 A1 Dec. 4, 2014

(51) Int. Cl.
*H04N 5/64* (2006.01)
*G02F 1/1335* (2006.01)

(52) U.S. Cl.
CPC ............ *H04N 5/64* (2013.01); *G02F 1/133602* (2013.01)

(58) Field of Classification Search
CPC ............................ H04N 5/64; G02F 1/133602
See application file for complete search history.

(56) References Cited

U.S. PATENT DOCUMENTS

| | | | |
|---|---|---|---|
| 5,144,292 A | 9/1992 | Shiraishi et al. | |
| 5,748,270 A | 5/1998 | Smith | |
| 5,798,610 A | 8/1998 | Koenck et al. | |
| 6,721,022 B1 | 4/2004 | Wang | |
| 6,925,313 B2 | 8/2005 | Kweon et al. | |
| 7,248,309 B2 * | 7/2007 | Kim et al. | 349/69 |
| 7,498,739 B1 * | 3/2009 | Steffensmeier et al. | 313/504 |
| 7,616,272 B2 * | 11/2009 | Miner et al. | 349/69 |
| 7,911,439 B2 * | 3/2011 | Bayrle et al. | 345/102 |
| 8,253,662 B2 | 8/2012 | Yamazaki et al. | |
| 8,836,887 B2 * | 9/2014 | Hung et al. | 349/58 |
| 2004/0109106 A1 * | 6/2004 | Yang et al. | 349/69 |
| 2005/0007517 A1 * | 1/2005 | Anandan | 349/69 |
| 2005/0157483 A1 | 7/2005 | Chan et al. | |
| 2006/0109397 A1 * | 5/2006 | Anandan | 349/69 |
| 2007/0064173 A1 * | 3/2007 | Chiu et al. | 349/69 |
| 2007/0164659 A1 * | 7/2007 | Lee et al. | 313/500 |
| 2007/0171331 A1 * | 7/2007 | Peng | 349/69 |
| 2008/0174721 A1 * | 7/2008 | Zhou | 349/69 |
| 2008/0266490 A1 * | 10/2008 | Mizuki et al. | 349/69 |
| 2009/0015142 A1 * | 1/2009 | Potts et al. | 313/504 |

(Continued)

FOREIGN PATENT DOCUMENTS

EP 1159725 12/2001

OTHER PUBLICATIONS

Effect of multi-walled carbon nanotubes on electron injection and charge generation in AC field-induced polymer electroluminescence Yonghua Chen, Gregory M. Smith, Eamon Loughman, Yuan Li, Wanyi Ni, David L. Carroll, Organic Electronics 14 (2013) 8-18.

(Continued)

*Primary Examiner* — Elmito Breval
(74) *Attorney, Agent, or Firm* — Law Office of Scott C Harris, Inc

(57) ABSTRACT

A television formed of a FIPEL panel that creates light in both front and rear directions. The television system has a light modulator and a backlight layer for the light modulator. The backlight layer emits light both toward the light modulator to create a television display, and away from the light modulator to create a backlight for the television. The television can be in a housing, with a transparent back. The housing can also have a bezel that can be lit by the backlight layer.

25 Claims, 7 Drawing Sheets

(56) References Cited

U.S. PATENT DOCUMENTS

| | | | | |
|---|---|---|---|---|
| 2012/0006978 | A1* | 1/2012 | Ludwig | 250/214.1 |
| 2012/0105306 | A1* | 5/2012 | Fleck | 345/1.1 |
| 2012/0256886 | A1* | 10/2012 | Ryu et al. | 345/204 |
| 2013/0250214 | A1* | 9/2013 | Sugi et al. | 349/69 |
| 2013/0314647 | A1* | 11/2013 | Yim et al. | 349/69 |

OTHER PUBLICATIONS http://hyperphysics.phy-astr.gsu.edu/%E2%80%8Chbase/vision/cie.html.

* cited by examiner

TRANSPARENT FIPEL BACKLIGHT PANELS WHICH DISPLAY COLORED LIGHT FROM A FRONT SURFACE TO A LIGHT MODULATOR AND A WHITE LIGHT FROM A BACK SURFACE

BACKGROUND

Watching a television, especially a large screen television in a dark room, can cause eyestrain. Some television manufacturers have shipped product where a light emitting surface, generally LEDs as the light emitters, that emit light from the back surface of the television. Some of these televisions also vary the intensity of the light and the color of the light based on the content being displayed on the screen. Customer feedback in the media would suggest that a variable light source providing back filled light is annoying at best.

SUMMARY

The inventor recognized that display devices generally do not have lighting intended to reduce the contrast between the display screen and the environment behind the display screen. In home environments, the contrast between the front of the display and the area behind the display is generally very high. This can make viewing content tiring because the viewer's eyes cannot easily manage the brightness of the viewed content and the darkness of the environment behind the device. Some televisions and display monitors will have a built in light source behind the display screen but this requires additional circuitry.

What is needed is a display device where the backlight for the light modulator, generally a LCD panel, provides light for both the light modulator and the area behind the display device.

The embodiments are meant to solve this issue by using the light modulator backlight that is used to backlight the spatial light modulator (e.g., the LCD) to also provide back filled light to soften the contrast between the display screen and the backdrop for the television.

According to an embodiment, video information is received and used to drive the light modulator. A processor may control the operation of the entire unit.

The present invention uses a light emitting device referred to as Field-Induced Polymer Electro-Luminescent device. The invention is intended to provide light from the front surface through a color filter to a light modulator such as a LCD panel and a white light from the back surface which may be diffused through a diffusor attached or bonded to the back surface of the FIPEL panel or a color filter attached or bonded to the back surface of the FIPEL panel. The diffusor may be a frosted sheet more commonly found in front of typical LED backlight assemblies or it may consist of microstructures designed to steer or defuse light.

BRIEF DESCRIPTION OF THE DRAWINGS in the drawings.

DETAILED DESCRIPTION

Figure 5:
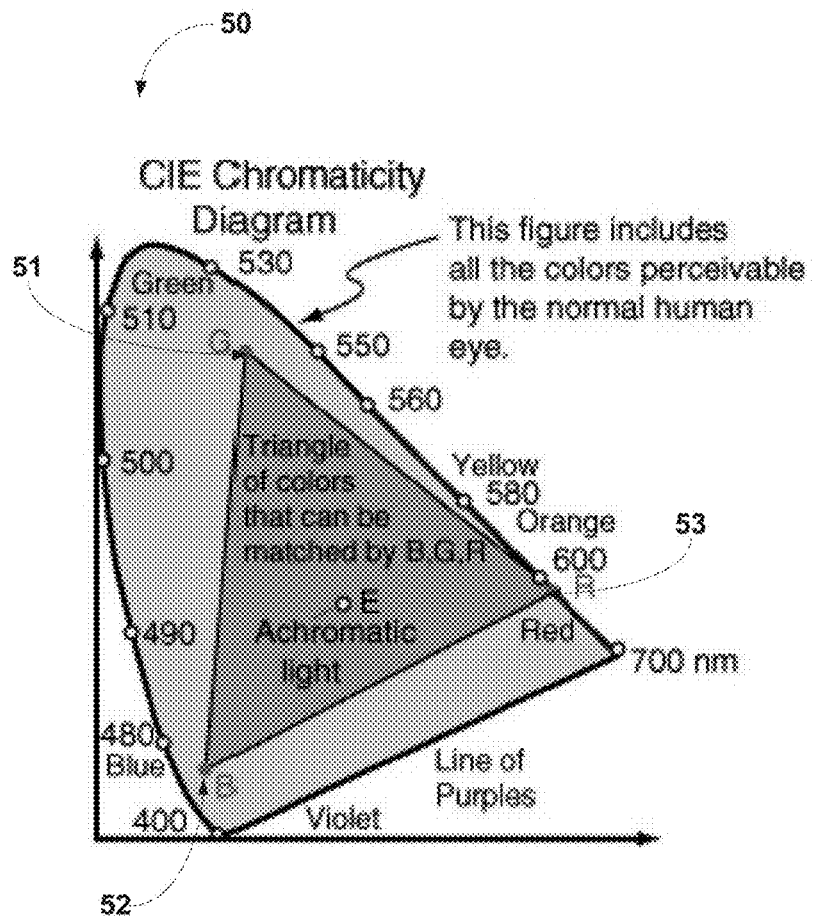
FIG. 5 is a depiction of the CIE color index with a triangle bounding the colors that are specified by the NTSC standard for television.

Embodiments use a lighting technology called Field Induced Polymer ElectroLuminescence, referred to as FIPEL lighting. FIG. 5, CIE color chart, is taken from a website located at: (http://hyperphysics.phy-astr.gsu.edu%E2%80%8Chbase/vision/cie.html) and is a replication of the CIE color index chart. Note that 51, 52 and 53 are points to the vertices Green (51), Blue (52) and Red (53). The three X,Y coordinates for a triangle that is the color space used for NTSC defined color.

A FIPEL backlight panel, is able to emit any color on the CIE color chart can emit color balanced white light in two directions.

Figure 1:
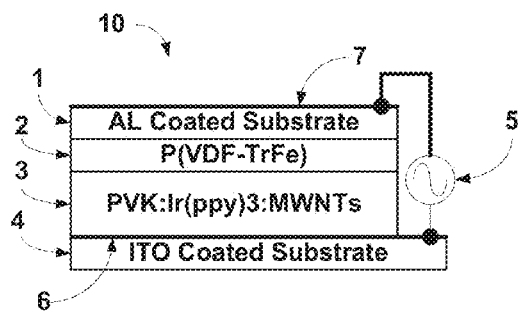
FIG. 1 is a depiction of an asymmetrical (single dielectric layer) FIPEL device that emits light from one surface.
Figure 2:
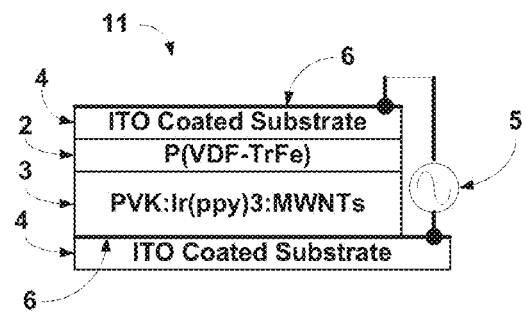
FIG. 2 is a depiction of an asymmetrical (single dielectric layer) FIPEL device that emits light from two surfaces.

To appreciate the simplicity of FIPEL devices, reference FIGS. 1 and 2.

FIGS. 1 and 2 illustrate single dielectric FIPEL devices. The basic construction of these FIPEL devices is discussed in the following.

Lab quality FIPEL devices are generally fabricated on glass or suitable plastic substrates with various coatings such as aluminum and Indium tin oxide (ITO). ITO is a widely used transparent conducting oxide because of its two chief properties, it is electrical conductive and optical transparent, as well as the ease with which it can be deposited as a thin film onto substrates. Because of this, ITO is used for conducting traces on the substrates of most LCD display screens. As with all transparent conducting films, a compromise must be made between conductivity and transparency, since increasing the thickness increases the concentration of charge carriers which in turn increases the material's conductivity, but decreases its transparency. The ITO coating used for the lab devices discussed here is approximately 100 nm in thickness. In FIG. 1, emissive side substrate 4 is coated with ITO coating 6 residing against PVK layer 3. In FIG. 2, ITO coating 6 is on both substrates as shown.

Figure 3:
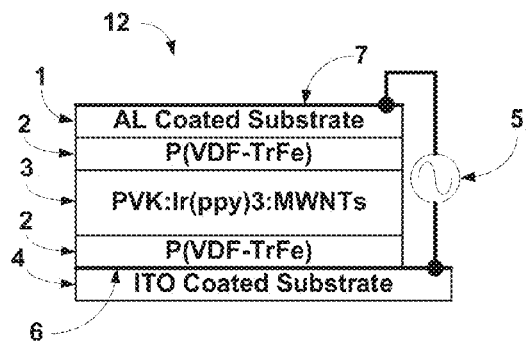
FIG. 3 is a depiction of a symmetrical (two dielectric layers) FIPEL device that emits light from one surface.
Figure 4:
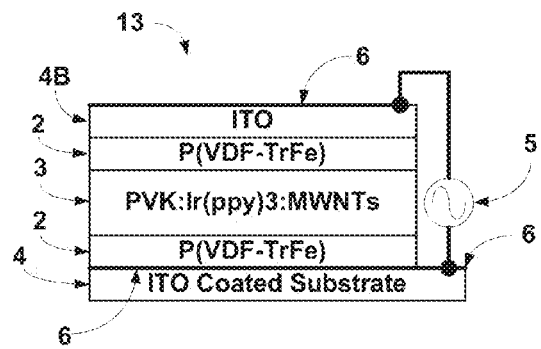
FIG. 4 is a depiction of a symmetrical (two dielectric layers) FIPEL device that emits light from two surfaces.

Substrate 1 in FIGS. 1 and 3 is coated with aluminum (AL) coating 7. The resulting thickness of the AL deposition is sufficient to be optically opaque and reflective. This ensures that any light from emissive layer 3 that travels toward substrate 1 is reflected and directed back through emissive substrate 4 with ITO coating 6 for devices illustrated in FIG. 1. If it is desired that light be emitted through both substrates, a substrate 4 with an ITO coating 6 will be substituted for substrate 1 with AL coating 7 as shown in FIG. 2.

The differences between the two similar substrates is in how the ITO coating 6 is positioned. In FIG. 1, emissive ITO coating 6 is positioned such that ITO coating 6 on substrate 4 is physically in contact with PVK layer 3. In FIG. 2, substrate 1 with Al coating 7 (FIG. 1) is replaced with substrate 4 with ITO coating 6 not in physical contact with the P(VDF-TrFe) (dielectric layer) layer 2. This allows light to be emitted from both the top and bottom surfaces of the FIPEL device.

Dielectric layer 2 in all cases is composed of a copolymer of P(VDF-TrFE) (51/49%). The dielectric layer is generally spin coated against the non-AL coated 7 side of substrate 1 or non-ITO coated 6 of substrate 4 of the top layer (insulated side). In all cases the dielectric layer is approximately 1,200 nm thick.

Emissive layer 3 is composed of a mix polymer base of poly(N-vinylcarbazole):fac-tris(2-phenylpyri-dine)iridium (III) [PVK:Ir(ppy)3] with Medium Walled Nano Tubes (MWNT). The emissive layer coating is laid onto the dielectric layer to a depth of approximately 200 nm. For the lab devices with the greatest light output the concentration of MWNTs to the polymer mix is approximately 0.04% by weight.

When an alternating current is applied across the devices shown in FIGS. 1 and 2 (asymmetrical devices containing 1 dielectric layer) the emissive layer emits light at specific wavelengths depending on the frequency of the alternating current. The alternating current is applied across the conductive side of the top substrate 1 (Al coating 7) or substrate 4 and the conductive side (ITO coating 6) of bottom substrate 4. Light emission comes from the injection of electrons and holes into the emissive layer. Holes follow the PVK paths in the mixed emissive polymer and electrons follow the MWNTs paths.

Carriers within the emissive layer then recombine to form excitons, which are a bound state of an electron and hole that are attracted to each other by the electrostatic force or field in the PVK host polymer, and are subsequently transferred to the Ir(ppy)3 guest, leading to the light emission.

The frequency of the alternating current applied across the substrates of the FIPEL panel can also determine the color of light emitted by the panel. Any index on the CIE chart can be duplicated by selecting the frequency of the alternating current. Signal generator 5 may be of a fixed frequency which is set by electronic components or signal generator 5 may be controlled by a microprocessor executing algorithms that determine the frequency of signal generator 5 based on stimuli.

Aluminum coating 7 may also be any reflective and conductive coating such as but not limited to tin, nickel or other conductive and reflective coatings.

ITO coating 6 may be any conductive and transparent material such as, but not limited to graphene or ITO.

Figure 6:
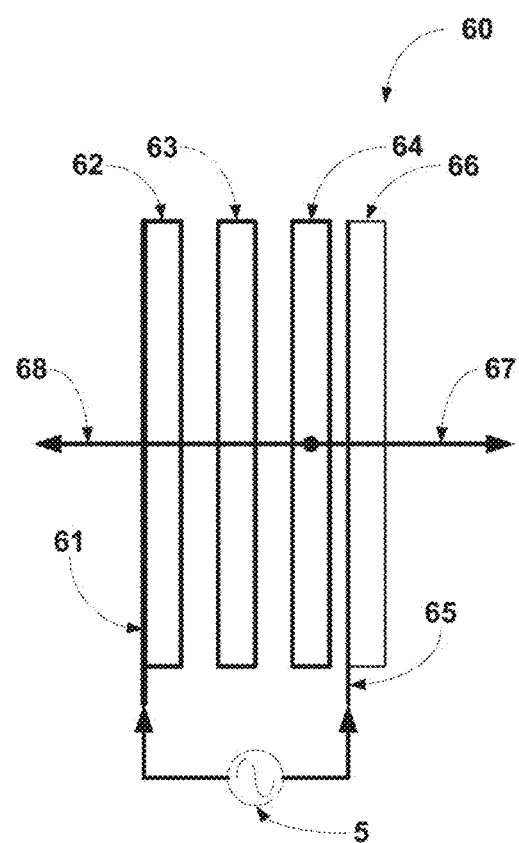
FIG. 6 is a depiction of a FIPEL panel showing the individual components comprising the panel.

Now referencing FIG. 6 where 60 depicts the components comprising a typical FIPEL light emitting panel. In this depiction, transparent conductive field coating 61 is bonded or coated to field substrate 62. Transparent conductive field coating 61 conducts alternating current from signal generator 5. Dielectric layer 63 is in physical contact with field substrate 62. Emissive layer 64 emits light in two directions as shown by emitted light 67 and emitted light 68. Emitted light 67 is emitted toward the front of the FIPEL panel and emitted light 68 is emitted toward the back of the FIPEL panel. Transparent conductive coating 65 is supported by emissive substrate 66. Transparent conductive emissive coating 65 carries alternating current from signal generator 5 to emissive layer 64. Note that the spacing between components 62, 63, 64 and 65/66 is for illustrative purposes only. In an actual FIPEL panel all of the components are in physical contact with adjacent components.

Figure 7A:
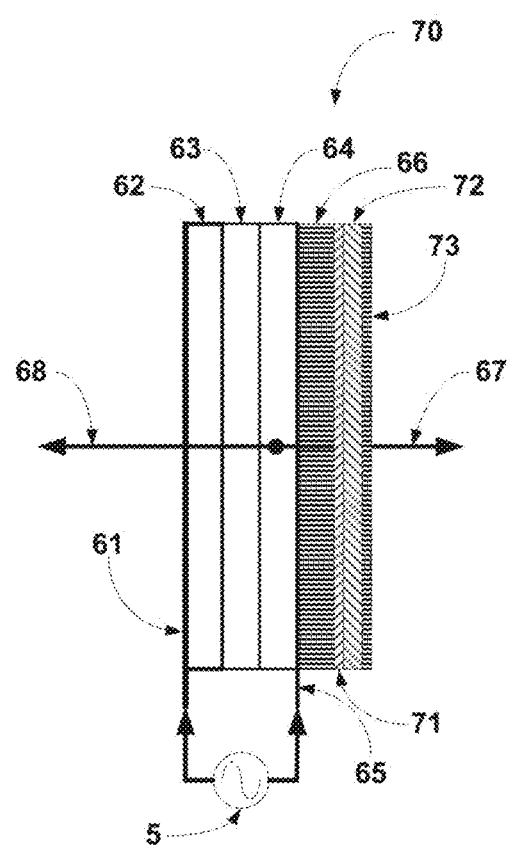
FIG. 7A is a depiction of a FIPEL panel in contact with a LCD light modulator assemble where one of the FIPEL panel substrates is also the first polarizer for the light modulator.

Now referencing FIG. 7A where 70 depicts a FIPEL panel in physical contact with a LCD light modulator. A normal LCD light modulator will have a polarized element between a backlight assembly and the color film normally between the polarizer and the LCD panel. In depiction 70, emissive substrate 66 is polarized thus eliminating one additional element in the assembly. In this depiction, emitted light 67 passes through transparent conductive emissive coating 65, emissive substrate 66 which is polarized, color film 71, LCD panel 72 and exit polarizer 73. Because the backlight is physically attached or bonded to the LCD light modulator assembly, air gaps normally found between backlight assemblies and the light modulator are not necessary.

Figure 7B:
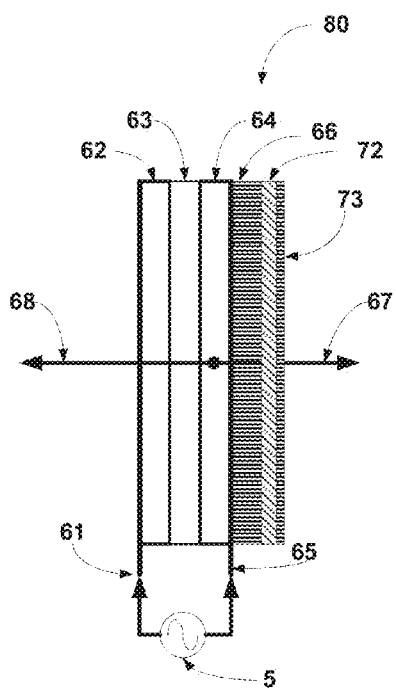
FIG. 7B is a depiction of a FIPEL panel in contact with a LCD light modulator assemble where one of the FIPEL panel substrates is also the first polarizer and color filter for the light modulator.

Now referencing FIG. 7B where 80 depicts a FIPEL panel in physical contact with a LCD light modulator where the color filter is part of emissive substrate 66. In this depiction, emissive substrate 66 is also polarized and contains the color filter details thus eliminating a component of the FIPEL LCD light modulator assembly. In this depiction, light 67 emitted toward the front of the assembly passes through transparent conductive emissive coating 65. Emissive substrate 66 which is polarized and has the attributes of color film shown as 71 in FIG. 7A, LCD panel 72 and exit polarizer 73. This depiction has two less components (polarizer sheet and color film) than that depicted in FIG. 7A and light is also emitted toward the back of the assembly as emitted light 68.

Figure 7C:
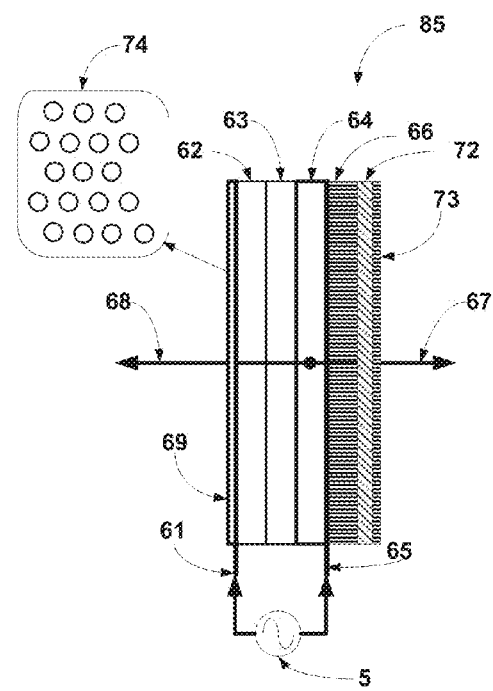
FIG. 7C is a depiction of a FIPEL panel in contact with a LCD light modulator assembly where an additional structure attached to the back of the FIPEL panel.

Now referencing FIG. 7C where 85 depicts a FIPEL panel in physical contact with a LCD light modulator where 69, an additional structure, is attached or bonded to the back of the FIPEL panel LCD light modulator. In this depiction, the LCD light modulator assembly is identical to that in FIG. 7B. In depiction 85, structure 69 may be a diffusor sheet attached or bonded to transparent conducting coating 61 supported by field substrate 62. The diffusor may be a frosted sheet designed to diffuse or soften emitted light 68.

In another embodiment, diffusor 69 may be included and functionally replaces field substrate 62 with physical structure 69 missing from the FIPEL assembly. In another embodiment, diffusor 69 may include a colored film in place of or together with diffusor structure 69. In another embodiment, structure 69 may be a group of optical structures 74 that are molded or formed on the surface of the structure for steering emitted light 68 in particular directions. The optical structures 74 may be micro-lenses. In another embodiment, the optical structures 74 may be diffusors so that the diffused light can contain patterns. All of the embodiments of depiction 85 may be indented to soften and/or color emitted light 68.

Figure 8:
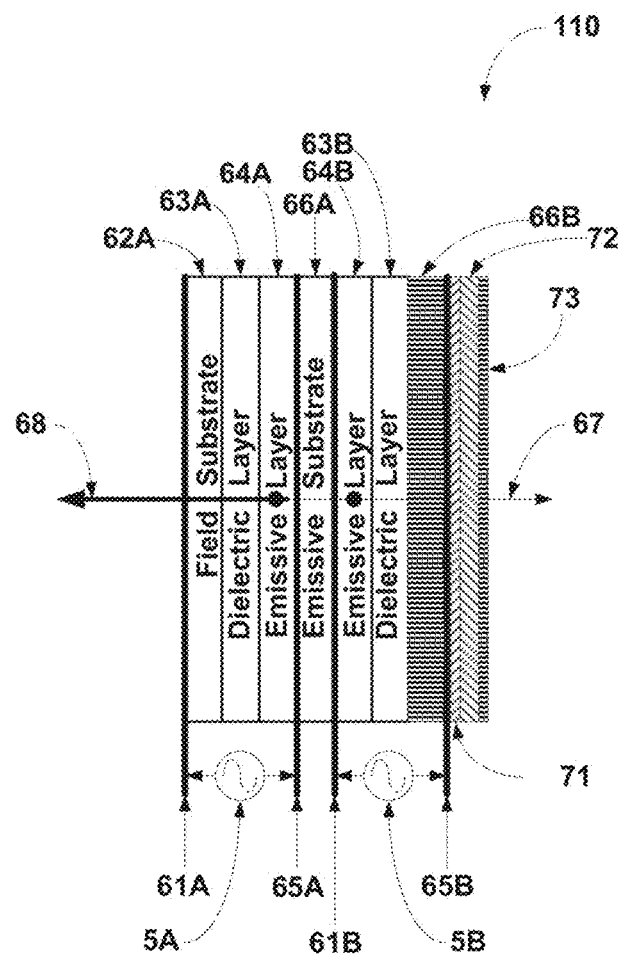
FIG. 8 is a depiction of two FIPEL panels attached together such that they emit twice the light output as a single panel.

Now referencing FIG. 8 where 110 depicts a FIPEL LCD light modulator where two FIPEL panels are stacked together to increase the amount of light that can be emitted. In this depiction, left side FIPEL panel is comprised of transparent conductive field coating 61A supported by field substrate 62A conducts alternating current from signal generator 5A, dielectric 63A, emissive layer 64A and transparent conductive emissive coating 65A supported by emissive substrate 66A. The right side FIPEL panel in this depiction is composed of emissive substrate 66A that supports transparent conductive emissive coating 61B, emissive layer 64B, dielectric layer 63B and field substrate 66B supporting transparent conductive field coating 65B. Note that in depiction 110, emissive substrate 66A is common between the left FIPEL panel and the right FIPEL panel. Light from both FIPEL panels emits in two directions from both emissive layers 64A and 64B as emitted light 67 emitting toward the front of the assembly and emitted light 68 emitting toward the back of the assembly.

Figure 9A:
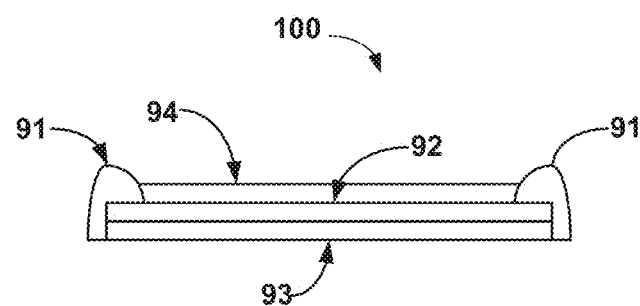
FIGS. 9A and 9B is a depiction of the top and front of a bezel attached to a display panel where the bezel bleeds light from the backlight and light pipes the light to the front of the bezel.
Figure 9B:
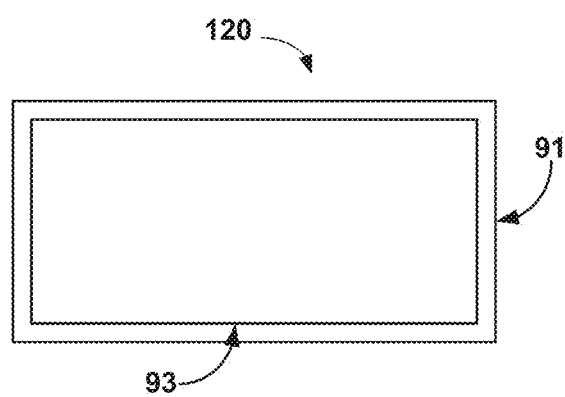

Now referencing FIGS. 9A and 9B where 100 depicts a top view and 120 depicts a front view of a display monitor or television. In this depiction, the top view shows light modulator 93, FIPEL panel 92, transparent back housing 94 and bezel 91. The front view 120 shows bezel 91 and light modulator 93. In these depictions note that bezel 91 surrounds the light modulator and the top view shows the back of bezel 91 covering a portion of FIPEL panel 92. In this depiction, bezel 91 serves the function of a light guide that guides a portion of emitted light 68 around to the front of the monitor/television for front ambient lighting. Note that the light that is captured from FIPEL panel 92 is from the back of the panel. The light not captured by bezel 91 passes through transparent back housing 94 for wall lighting. The bezel can capture a bezel assembly that captures light from the FIPEL panel backlight assembly for front, edge and back directed light.

Although only a few embodiments have been disclosed in detail above, other embodiments are possible and the inventors intend these to be encompassed within this specification. The specification describes certain technological solutions to solve the technical problems that are described expressly and inherently in this application. This disclosure describes embodiments, and the claims are intended to cover any modification or alternative or generalization of these embodiments which might be predictable to a person having ordinary skill in the art. For example, the techniques described herein can be used with other kinds of light modulators and light emitters.

Those of skill would further appreciate that the various illustrative logical blocks, modules, circuits, and algorithm steps described in connection with the embodiments disclosed herein may be implemented as electronic hardware, computer software running on a specific purpose machine that is programmed to carry out the operations described in this application, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments.

The various illustrative logical blocks, modules, and circuits described in connection with the embodiments disclosed herein, may be implemented or performed with a general or specific purpose processor, or with hardware that carries out these functions, e.g., a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has an internal bus connecting to cards or other hardware, running based on a system BIOS or equivalent that contains startup and boot software, system memory which provides temporary storage for an operating system, drivers for the hardware and for application programs, disk interface which provides an interface between internal storage device(s) and the other hardware, an external peripheral controller which interfaces to external devices such as a backup storage device, and a network that connects to a hard wired network cable such as Ethernet or may be a wireless connection such as a RF link running under a wireless protocol such as 802.11. Likewise, external bus 18 may be any of but not limited to hard wired external busses such as IEEE-1394 or USB. The computer system can also have a user interface port that communicates with a user interface, and which receives commands entered by a user, and a video output that produces its output via any kind of video output format, e.g., VGA, DVI, HDMI, display port, or any other form. This may include laptop or desktop computers, and may also include portable computers, including cell phones, tablets such as the IPAD™ and Android platform tablet, and all other kinds of computers and computing platforms.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, using cloud computing, or in combinations. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of tangible storage medium that stores tangible, non transitory computer based instructions. An exemplary storage medium is coupled to the processor such that the processor can read information from, and write information to, the storage medium. In the alternative, the storage medium may be integral to the processor. The processor and the storage medium may reside in reconfigurable logic of any type.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A television system, comprising
a backlight layer formed of first and second conductive and transparent substrates, and a light emissive polymer layer between said first and second conductive and transparent substrates;
a signal generator, connected to energize said emissive polymer layer to emit light, the light emitted by said emissive polymer layer having a color dependent on a frequency of the signal generator,
said backlight layer emitting light through both said first and second conductive and transparent substrates;
a light modulator, coupled to said first substrate, to produce a television output; and
a housing that holds said light modulator and said backlight layer, and has a television display portion at a front of the housing and a transparent portion at a rear of said housing, and light is emitted from the rear of the housing by said backlight layer,
whereby light from said backlight layer provides light to both said light modulator and through said transparent rear of said housing, wherein said transparent portion includes a diffuser, between said backlight and said rear of said housing, and where the diffuser includes plural separated optical structures formed thereon which are located and structured to form a pattern in the emitted backlight.

2. The television system as in claim 1, wherein said light modulator is directly connected to said first substrate.

3. The television system as in claim 1, wherein said backlight layer further includes an emissive support structure, and said emissive support structure is polarized.

4. The television system as in claim 3, wherein said emissive support structure includes a color film.

5. The television system as in claim 1, wherein the diffuser includes a color film.

6. The television system as in claim 1, wherein the optical structures are micro-lenses.

7. The television system as in claim 1, wherein the optical structures are diffuser devices.

8. The television system as in claim 1, wherein the backlight layer is formed of a dielectric layer in addition to said emissive polymer layer, between first and second transparent and conductive substrates.

9. The television system as in claim 8, further comprising a second backlight layer, stacked on said first backlight layer and sharing a common substrate between said first and said second backlight layers, said second backlight layer also including at least one emissive layer, and one dielectric layer, between first and second transparent and conductive substrates, and wherein emitted light from both said first backlight layer and said second backlight layer creates brighter output light to both front and rear, than the light from just said first backlight layer.

10. The television system as in claim 1, wherein said optical structures also steering portions of the light emitted from the rear of the housing towards structures in the housing.

11. The television system as in claim 10, wherein said housing also includes a bezel surrounding the television display portion, and said optical structures steer the light to illuminate said bezel.

12. A television system, comprising
a housing;
a light modulator in the housing;
a backlight layer for the light modulator, that emits light toward said light modulator to create a television display which is viewable through a front of the housing, and where said backlight layer also emits light away from said light modulator to create a backlight for the television, where the backlight is emitted through a rear of the housing, opposite to the front of the housing; and
a diffuser layer, between said backlight layer and the rear of the housing, said diffuser layer including a group of optical structures modifying the backlight before exiting, said optical structures creating diffused light that contains patterns in the light.

13. The television system as in claim 12, wherein parts of said light modulator are formed in the backlight layer.

14. The television system as in claim 13, wherein a polarizer for the light modulator is formed in the backlight layer.

15. The television system as in claim 13, wherein a color filter for the light modulator is formed in the backlight layer.

16. The television system as in claim 12, wherein said optical structures include plural micro-lenses.

17. The television system as in claim 16, wherein said housing also includes a bezel surrounding the television display portion, and said optical structures also steer the light to illuminate said bezel.

18. The television system as in claim 16, wherein said housing also includes a bezel surrounding a front of the television display, and said backlight layer backlights said bezel.

19. The television system as in claim 12, wherein said backlight layer includes first and second backlight layers, stacked on one another, said first backlight layer including first and second conductive and transparent layers with a light emissive layer therebetween, and said second backlight layer also including at least one emissive layer, between transparent and conductive substrates, and wherein emitted light from both said first backlight layer and said second backlight layer creates brighter output light to both front and rear, than the light from just said first backlight layer.

20. The television system as in claim 19, wherein said first and second backlight layers share one of the transparent and conductive substrates.

21. A television system, comprising
a light modulator;
a backlight layer for the light modulator, formed of first and second conductive and transparent substrates, and an emissive polymer layer between said first and second conductive that is energized to emit light through both said first and second transparent substrates, wherein said backlight layer includes first and second backlight layers, stacked on one another and sharing a common substrate between said first and second backlight layers, said first backlight layer including first and second conductive and transparent layers with a light emissive layer there between, and said second backlight layer also including at least one emissive layer, between transparent and conductive substrates and wherein emitted light from both said first backlight layer and said second backlight layer creates brighter output light to both front and rear, than the light from just said first backlight layer;
a signal generator, connected to energize said emissive polymer layer to emit light, the light emitted by said emissive polymer layer having a color dependent on a frequency of the signal generator;
a housing that holds said light modulator and said backlight layer, and has a bezel surrounding a screen of the television, and has a television display portion at a front of the housing and a transparent portion at a rear of said housing, and light from said backlight layer is emitted in both frontward and rearward directions to provide light to both said light modulator and also to said rear of said housing,
wherein said bezel is a light guide, located to receive a portion of the light to receive a portion of the light emitted by said backlight layer, and to guide the light that is captured to light said bezel.

22. The television system as in claim 21, wherein parts of said light modulator are formed in the backlight layer.

23. The television system as in claim 22, wherein a polarizer for the light modulator is formed in the backlight layer.

24. The television system as in claim 21, wherein said transparent portion includes a diffuser, between said backlight and said back of said housing and where said diffuser includes plural optical structures therein which create a pattern in the emitted backlight.

25. The television system as in claim 21, wherein said first and second backlight layers share one of the transparent and conductive substrates.

* * * * *